(12) United States Patent
Yeh et al.

(10) Patent No.: US 8,378,042 B2
(45) Date of Patent: Feb. 19, 2013

(54) FINISHING PROCESS FOR AMORPHOUS POLYMERS

(75) Inventors: Richard Cheng-Ming Yeh, Bellaire, TX (US); Rainer Kolb, Kingwood, TX (US)

(73) Assignee: ExxonMobil Chemical Patents Inc., Houston, TX (US)

( * ) Notice: Subject to any disclaimer, the term of this patent is extended or adjusted under 35 U.S.C. 154(b) by 692 days.

(21) Appl. No.: 12/569,009

(22) Filed: Sep. 29, 2009

(65) Prior Publication Data

US 2010/0273936 A1 Oct. 28, 2010

Related U.S. Application Data

(60) Provisional application No. 61/173,501, filed on Apr. 28, 2009, provisional application No. 61/173,528, filed on Apr. 28, 2009.

(51) Int. Cl.
*C08F 4/76* (2006.01)
*C08F 4/64* (2006.01)
*C08F 210/06* (2006.01)
*C08F 210/02* (2006.01)

(52) U.S. Cl. ........ 526/170; 526/160; 526/941; 526/943; 526/348; 526/351

(58) Field of Classification Search .......... 526/348, 526/170, 160, 943, 351
See application file for complete search history.

(56) References Cited

U.S. PATENT DOCUMENTS

| | | | |
|---|---|---|---|
| 4,540,753 A | 9/1985 | Cozewith et al. | |
| 4,792,595 A | 12/1988 | Cozewith et al. | |
| 4,804,794 A | 2/1989 | Ver Strate et al. | |
| 4,892,851 A | 1/1990 | Ewen et al. | |
| 4,959,436 A | 9/1990 | Cozewith et al. | |
| 5,026,798 A | 6/1991 | Canich | |
| 5,055,438 A | 10/1991 | Canich | |
| 5,068,047 A | 11/1991 | Chung et al. | |
| 5,096,867 A | 3/1992 | Canich | |
| 5,132,281 A | 7/1992 | Chevallier et al. | |
| 5,151,204 A | 9/1992 | Struglinski | |
| 5,153,157 A | 10/1992 | Hlatky et al. | |
| 5,155,080 A | 10/1992 | Elder et al. | |
| 5,264,405 A | 11/1993 | Canich | |
| 5,318,935 A | 6/1994 | Canich et al. | |
| 5,391,617 A | 2/1995 | Olivier et al. | |
| 5,427,702 A * | 6/1995 | Chung et al. | 508/221 |
| 5,446,221 A | 8/1995 | Struglinski | |
| 5,451,630 A | 9/1995 | Olivier et al. | |
| 5,451,636 A | 9/1995 | Olivier et al. | |
| 5,621,126 A | 4/1997 | Canich et al. | |
| 5,665,800 A | 9/1997 | Lai et al. | |
| 5,744,429 A * | 4/1998 | Chung et al. | 508/221 |
| 5,837,773 A | 11/1998 | Olivier et al. | |
| 5,955,625 A | 9/1999 | Canich | |
| 5,969,070 A | 10/1999 | Waymouth et al. | |
| 6,034,187 A | 3/2000 | Maehama et al. | |
| 6,265,338 B1 | 7/2001 | Canich | |
| RE37,400 E | 10/2001 | Canich | |
| 6,319,998 B1 | 11/2001 | Cozewith et al. | |
| 6,376,409 B1 | 4/2002 | Burkhardt et al. | |
| 6,376,412 B1 | 4/2002 | Burkhardt et al. | |
| 6,380,120 B1 | 4/2002 | Burkhardt et al. | |
| RE37,788 E | 7/2002 | Canich | |
| 6,525,007 B2 | 2/2003 | Okada et al. | |
| 6,638,887 B1 | 10/2003 | Canich | |
| 6,734,270 B1 * | 5/2004 | Minami et al. | 526/351 |
| 6,753,381 B2 | 6/2004 | Mishra et al. | |
| 6,852,787 B1 * | 2/2005 | McMichael et al. | 524/451 |
| 6,977,287 B2 * | 12/2005 | Agarwal et al. | 526/339 |
| 7,053,153 B2 | 5/2006 | Schauder | |
| 7,163,907 B1 | 1/2007 | Canich et al. | |
| 7,173,099 B1 * | 2/2007 | Minami | 526/351 |
| 7,402,235 B2 | 7/2008 | Huang | |
| 7,569,646 B1 | 8/2009 | Canich | |
| 8,013,069 B2 * | 9/2011 | Harrington et al. | 525/191 |
| 2002/0055445 A1 | 5/2002 | Okada et al. | |
| 2004/0038850 A1 | 2/2004 | Huang | |
| 2004/0121922 A1 | 6/2004 | Okada et al. | |
| 2006/0170137 A1 * | 8/2006 | Yeh et al. | 264/349 |
| 2007/0167315 A1 | 7/2007 | Arriola et al. | |
| 2008/0023215 A1 * | 1/2008 | Uehara et al. | 174/137 B |
| 2009/0209721 A1 | 8/2009 | Ikeda et al. | |
| 2010/0273693 A1 | 10/2010 | Datta et al. | |

FOREIGN PATENT DOCUMENTS

| | | |
|---|---|---|
| EP | 0 287 239 | 10/1988 |
| EP | 0 511 665 | 11/1992 |
| EP | 0 577 581 | 1/1994 |
| EP | 0 578 838 | 1/1994 |
| EP | 0 638 611 | 2/1995 |
| EP | 1 148 115 | 10/2001 |
| EP | 1 178 102 | 2/2002 |
| EP | 1 262 498 | 12/2002 |
| JP | 2000-191851 A * | 7/2000 |
| WO | WO 93/19103 | 9/1993 |
| WO | WO 99/07788 | 2/1999 |
| WO | WO 99/29743 | 6/1999 |
| WO | WO 99/45062 | 9/1999 |
| WO | WO 99/60033 | 11/1999 |
| WO | WO 01/48034 | 7/2001 |
| WO | WO 03/040201 | 5/2003 |
| WO | WO 2004/039852 A1 * | 5/2004 |
| WO | WO 2006/102146 | 9/2006 |
| WO | WO 2009/012153 | 1/2009 |
| WO | WO 2010/126721 | 11/2010 |

OTHER PUBLICATIONS

W. Spaleck et al., "*The Influence of Aromatic Substituents on the Polymerization Behavior of Bridged Zirconocene Catalysts*", Organometallics, 1994, vol. 13, pp. 954-963.

(Continued)

*Primary Examiner* — Rip A. Lee

(57) ABSTRACT

Extruded, copolymer pellet compositions and methods for making the same. A copolymer pellet composition can have an ethylene content of about 40 wt % to about 50 wt % and a propylene content of about 50 wt % to about 60 wt %, based on total weight of the copolymer, wherein the copolymer has a MFR (230° C./2.16 kg) of from about 3.0 g/10 min and about 25 g/10 min; a MWD (Mw/Mn) of about 2.3 or less; and no measurable melting peak, as measured by DSC.

25 Claims, 1 Drawing Sheet

OTHER PUBLICATIONS

H. Brintzinger et al., "*ansa-Zirconocene Polymerization Catalysts with Annelated Ring Ligands—Effects on Catalytic Activity and Polymer Chain Length*", Organometallics, 1994, vol. 13, pp. 964-970.

A. C. Ouano, "*Gel Permeation Chromatography*", Polymer Molecular Weights Part II, ed. P. E. Slade, Marcel Dekker, Inc., NY 1975, pp. 287-368.

F. Rodriguez, "*The Molecular Weight of Polymers*", Principles of Polymer Systems $3^{rd}$ ed., Hemisphere Pub. Corp., NY, 1989, pp. 155-160.

G. Ver Strate et al., "*Near Monodisperse Ethylene-Propylene Copolymers by Direct Ziegler-Natta Polymerization. Preparation, Characterization, Properties*", Macromolecules, 1988, vol. 21, pp. 3360-3371.

U.S. Appl. No. 60/243,192, "*Processes and Apparatus for Continuous Solution Polymerization*", Oct. 25, 2000.

Wittig, H. et al., "*New Triarylboro Compounds and Their Tetraarylo Borate Complexes. V*", Chemische Berichte, 1955, vol. 88, pp. 962-976.

\* cited by examiner

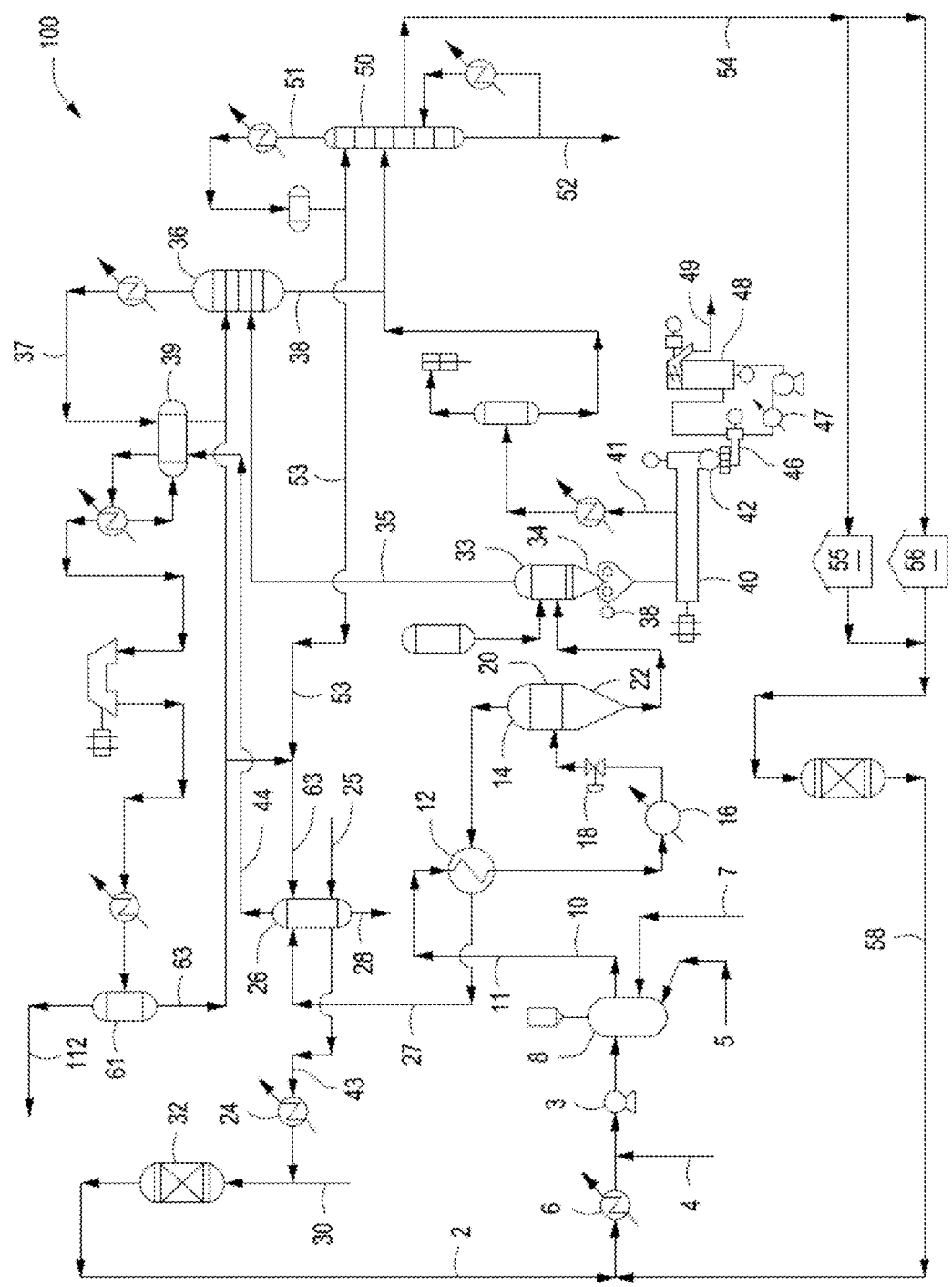

US 8,378,042 B2

FINISHING PROCESS FOR AMORPHOUS POLYMERS

CROSS-REFERENCE TO RELATED APPLICATIONS

This application claims priority from U.S. Provisional Patent App. No. 61/173,501, filed on Apr. 28, 2009, and claims priority from U.S. Provisional Patent App. No. 61/173,528, filed on Apr. 28, 2009, both of which are herein incorporated by reference in their entirety.

FIELD OF THE INVENTION

Provided can be ethylene-based copolymers, methods of preparing the same, lubricating oil compositions, which include ethylene-based copolymers, methods for preparing such lubricating oil compositions, and end uses for such ethylene-based copolymers and lubricating oil compositions.

BACKGROUND OF THE INVENTION

Soft or amorphous polymers are difficult to pelletize, convey, and further finish because the pellets tend to agglomerate or stick together. Amorphous polymers having low viscosity or high MFR of greater than 2 g/10 min (230° C., 2.16 kg) are especially prone to this problem. To counter act this problem, the polymer has been dusted with fine powder of, for example, low density polyethylene or ethylene vinyl acetate (EVA). The required dust level, however, detrimentally affects further processing, such as packing the resin in bales. Furthermore, applications requiring such soft or amorphous polymers, such as viscosity index improvers, can only tolerate a low level of dust before solubility problems arise in the oil.

Other attempts to counter act the problem of pellet agglomerates have used semi crystalline polymers, which do not tend to form agglomerates, to produce blends which remain free flowing. This, however, will lead to changes in the final product and is acceptable only in a limited number of applications. In the case of viscosity index improvers, for example, these added semicrystalline polymers have the tendency to interact with wax in the final oil formulation and are thus unacceptable.

Yet other attempts to counter act the problem of pellet agglomerates have involved refrigeration of the conveying equipment. This however, can, lead to unacceptably high water concentrations in the final polymer.

There is a need, therefore, for a new process and system to prevent pellet agglomeration that does not require unacceptably high dust levels, refrigeration of the conveying lines or the blending of other polymer components.

SUMMARY OF THE INVENTION

Extruded, copolymer pellet compositions and methods for making the same are provided. In at least one specific embodiment, a copolymer pellet compositions has an ethylene content of about 40 wt % to about 50 wt % and a propylene content of about 50 wt % to about 60 wt %, based on total weight of the copolymer, wherein the copolymer has a MFR (230° C./2.16 kg) of from about 3.0 g/10 min and about 25 g/10 min; a MWD (Mw/Mn) of about 2.3 or less; and no measurable melting peak, as measured by DSC.

In at least one specific embodiment, a method for making a copolymer pellet comprises pelletizing a copolymer having a MFR (230° C./2.16 kg) of from about 3.0 g/10 min and about 25 g/10 min; a MWD (Mw/Mn) of about 2.3 or less; and no measurable melting peak, as measured by DSC to provide at least one pellet having a diameter of about 3.0 mm or more and a length to diameter ratio (L/D) of from about 0.8 to about 1.2. The pellet can be dusted with about 1.0 wt % or less dust, based on total weight of the pellet, wherein the dusted pellet has a MFR (230° C./2.16 kg) of from about 3.0 g/10 min and about 10 g/10 min; a MWD (Mw/Mn) of about 2.3 or less; and no measurable melting peak, as measured by DSC.

In at least one other specific embodiment, a method for making a copolymer pellet comprises polymerizing ethylene and propylene in the presence of a catalyst composition at conditions sufficient to produce an ethylene-propylene copolymer comprising an ethylene content of about 40 wt % to about 50 wt % and a propylene content of about 50 wt % to about 60 wt %, based on total weight of the copolymer, wherein the catalyst composition comprises di(p-triethylsilylphenyl)methenyl[cyclopentadienyl](2,7-di-tert-butylfluoren-9-yl)]hafnium dimethyl and N,N-dimethylanilinium tetrakis(pentafluorophenyl)borate. The copolymer is pelletized to provide at least one pellet having a diameter of about 3.0 mm or more and a length to diameter ratio (L/D) of from about 0.8 to about 1.2. The pellet is dusted with about 0.8 wt % or less dust, based on total weight of the pellet, wherein the dusted pellet has a MFR (230° C./2.16 kg) of from about 3.0 g/10 min and about 10 g/10 min; a MWD (Mw/Mn) of about 2.3 or less; and no measurable melting peak, as measured by DSC.

BRIEF DESCRIPTION OF THE DRAWINGS

So that the recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

FIG. 1 depicts an illustrative solution polymerization system 100, according to one or more embodiments herein.

DETAILED DESCRIPTION

Each of the appended claims defines a separate invention, which for infringement purposes is recognized as including equivalents to the various elements or limitations specified in the claims. Depending on the context, all references below to the "invention" may in some cases refer to certain specific embodiments only. In other cases it will be recognized that references to the "invention" will refer to subject matter recited in one or more, but not necessarily all, of the claims. Each of the inventions will now be described in greater detail below, including specific embodiments, versions and examples, but the inventions can be not limited to these embodiments, versions or examples, which can be included to enable a person having ordinary skill in the art to make and use the inventions, when the information in this disclosure is combined with available information and technology. Unless stated otherwise, melting temperature Tm is obtained by DSC analysis as described in the Examples section below.

The ethylene-based copolymer can include less than about 80 wt % of units derived from ethylene and alpha olefin comonomers having 3 to 20 carbon atoms. As used herein "ethylene-based copolymer" means a copolymer composed of a substantial quantity of ethylene monomer, e.g., greater than 30 wt % ethylene, and one or more comonomers. Thus, ethylene-based copolymers can include more units derived from alpha olefin comonomer by weight compared to units derived from ethylene. As used herein the term "copolymer" is any polymer having two or more monomers.

Suitable comonomers include propylene and α-olefins, such as $C_4$-$C_{20}$ α-olefins and preferably propylene and $C_4$-$C_{12}$ α-olefins. The α-olefin comonomer can be linear or branched, and two or more comonomers can be used, if desired. Thus, reference herein to "an alpha-olefin comonomer" includes one, two, or more alpha-olefin comonomers. Examples of suitable comonomers include propylene, linear $C_4$-$C_{12}$ α-olefins, and α-olefins having one or more $C_1$-$C_3$ alkyl branches. Specific examples include propylene; 1-butene; 3-methyl-1-butene; 3,3-dimethyl-1-butene; 1-pentene; 1-pentene with one or more methyl, ethyl or propyl substituents; 1-hexene with one or more methyl, ethyl or propyl substituents; 1-heptene with one or more methyl, ethyl or propyl substituents; 1-octene with one or more methyl, ethyl or propyl substituents; 1-nonene with one or more methyl, ethyl or propyl substituents; ethyl, methyl or dimethyl-substituted 1-decene, or 1-dodecene. Preferred comonomers include propylene, 1-butene, 1-pentene, 3-methyl-1-butene, 1-hexene, 3-methyl-1-pentene, 4-methyl-1-pentene, 3,3-dimethyl-1-butene, 1-heptene, 1-hexene with a methyl substituents on any of $C_3$-$C_5$, 1-pentene with two methyl substituents in any stoichiometrically acceptable combination on $C_3$ or $C_4$, 3-ethyl-1-pentene, 1-octene, 1-pentene with a methyl substituents on any of $C_3$ or $C_4$, 1-hexene with two methyl substituents in any stoichiometrically acceptable combination on $C_3$-$C_5$, 1-pentene with three methyl substituents in any stoichiometrically acceptable combination on $C_3$ or $C_4$, 1-hexene with an ethyl substituents on $C_3$ or $C_4$, 1-pentene with an ethyl substituents on $C_3$ and a methyl substituents in a stoichiometrically acceptable position on $C_3$ or $C_4$, 1-decene, 1-nonene, 1-nonene with a methyl substituents on any of $C_3$-$C_9$, 1-octene with two methyl substituents in any stoichiometrically acceptable combination on $C_3$-$C_7$, 1-heptene with three methyl substituents in any stoichiometrically acceptable combination on $C_3$-$C_6$, 1-octene with an ethyl substituents on any of $C_3$-$C_7$, 1-hexene with two ethyl substituents in any stoichiometrically acceptable combination on $C_3$ or $C_4$, and 1-dodecene.

Preferred alpha olefin comonomers can be propylene, butene, hexene, or octene. A more preferred alpha olefin comonomer is propylene. Another preferred olefin comonomer is 1 butene. Combinations propylene and butene can be contemplated.

Other suitable comonomers include internal olefins. Preferred internal olefins can be cis-2-butene and trans-2-butene. Other internal olefins can be contemplated.

Other suitable comonomers include polyenes. The term "polyene" as used herein refers to monomers having two or more unsaturations; i.e., dienes, trienes, etc. Polyenes particularly useful as co-monomers can be non-conjugated dienes, preferably can be straight chain, hydrocarbon di-olefins or cycloalkenyl-substituted alkenes, having about 6 to about 15 carbon atoms, for example: (a) straight chain acyclic dienes, such as 1,4-hexadiene and 1,6-octadiene; (b) branched chain acyclic dienes, such as 5-methyl-1,4-hexadiene; 3,7-dimethyl-1,6single ring alicyclic dienes, such as 1,4-cyclohexadiene; 1,5-cyclo-octadiene and 1,7-cyclododecadiene; (d) multi-ring alicyclic fused and bridged ring dienes, such as tetrahydroindene; norbornadiene; methyl-tetrahydroindene; dicyclopentadiene (DCPD); bicyclo-(2.2.1)-hepta-2,5-diene; alkenyl, alkylidene, cycloalkenyl and cycloalkylidene norbornenes, such as 5-methylene-2-norbornene (MNB), 5-propenyl-2-norbornene, 5-isopropylidene-2-norbornene, 5-(4-cyclopentenyl)-2-norbornene, 5-cyclohexylidene-2-norbornene, and 5-vinyl-2-norbornene (VNB); (e) cycloalkenyl-substituted alkenes, such as vinyl cyclohexene, allyl cyclohexene, vinyl cyclooctene, 4-vinyl cyclohexene, allyl cyclodecene; and vinyl cyclododecene. Of the non-conjugated dienes typically used, the preferred dienes can be dicyclopentadiene (DCPD), 1,4-hexadiene, 1,6-octadiene; 5-methyl-1,4-hexadiene; 3,7-dimethyl-1,6-octadiene; 5-methylene-2-norbornene, 5-ethylidene-2-norbornene (ENB), and tetracyclo (Δ-11,12) 5,8 dodecene. Note that throughout this application the terms "polyene," "non-conjugated diene," and "diene" can be used interchangeably. It is preferred to use dienes which do not lead to the formation of long chain branches. For successful use as VI improver non- or lowly branched polymer chains can be preferred. Other polyenes that can be used include cyclopentadiene and octatetra-ene.

The ethylene-based copolymer can include of from about 30 wt % to about 80 wt % ethylene-derived units. Preferably, the ethylene-based copolymer can include less than about 70 wt % ethylene-derived units, or less than about 60 wt % ethylene-derived units. In some embodiments, the ethylene-based copolymer can include of from about 40 wt % to about 80 wt % ethylene-derived units or from about 45 wt % to about 70 wt % ethylene-derived units. The ethylene-based copolymer can include from about 42 wt % to about 78 wt % ethylene-derived units, or from about 45 wt % to about 76 wt % ethylene-derived units, or from about 48 wt % to about 76 wt % ethylene-derived units, or from about 48 wt % to about 74 wt % ethylene-derived units, or from about 50 wt % to about 72 wt % ethylene-derived units, or from about 45 wt % to about 55 wt % ethylene-derived units. In other embodiments, the ethylene-based copolymers can include of from about 35 wt % to about 50 wt % unit derived from ethylene, or from about 40 wt % to about 50 wt % unit derived from ethylene, or from about 45 wt % to about 50 wt % unit derived from ethylene, or from about 45 wt % to about 49 wt % unit derived from ethylene, based on the weight of the ethylene-based copolymer.

In one or more embodiments, the ethylene-based copolymers can include at least 1.0 wt % or more of one or more α-olefins comonomer having 3 to 20 carbon atoms, based on the weight of the ethylene-based copolymer. The comonomer content also can range from a low of about 1.0 wt %, 2.0 wt %, or 3.0 wt % to a high of about 5.0 wt %, 7.0 wt %, or 10 wt %, based on the weight of the ethylene-based copolymer.

The ethylene-based copolymer can have a weight-average molecular weight (Mw) in terms of polystyrene, as measured by GPC, in the range of about 30,000 to about 800,000. More preferably, the weight average Mw is from about 50,000 to about 600,000 or from about 80,000 to about 400,000. Even more preferably, the weight average Mw is from about 70,000 to about 180,000.

The ethylene-based copolymer can have a number average molecular weight (Mn), as measured by GPC, of from about 10,000 to about 400,000, or in the range of about 20,000 to about 300,000, or in the range of about 30,000 to about 200,000.

The ethylene-based copolymer can have a molecular weight distribution (MWD or Mw/Mn) of about 5.0 or less, or about 4.0 or less, or 3.0 or less, or 2.2 or less. In one or more embodiments, the MWD is about 2.8, or less than about 2.6, or less than about 2.4, or less than about 2.3, or less than about 2.2. In one or more embodiments, the MWD is of from about 1.0 to about 3.0, or from about 1.5 to about 2.5.

The ethylene-based copolymer can be substantially, or completely amorphous. Substantially amorphous as used herein means less than about 2.0 wt % crystallinity. Preferably, the amorphous ethylene-based copolymers have less than about 1.5 wt % crystallinity, or less than about 1.0 wt % crystallinity, or less than about 0.5 wt % crystallinity, or less than 0.1 wt % crystallinity.

In one or more embodiments, the ethylene-based copolymer has no melting peak when measured by Differential Scanning Calorimetry (DSC). In other words, the ethylene-based copolymer has no crystallinity or is substantially amorphous, as evidenced by the absence of a peak measured by DSC.

In one or more embodiments, the ethylene-based copolymer has no melting point when measured by DSC. In other words, the ethylene-based copolymer has no crystallinity or is substantially amorphous, as evidenced by the absence of a peak measured by DSC.

In one or more embodiments, the ethylene-based copolymer has no melting transition when measured by DSC. In other words, the ethylene-based copolymer has no crystallinity or is substantially amorphous, as evidenced by the absence of a peak measured by DSC.

In one or more embodiments, the ethylene-based copolymer has no melting temperature (Tm) when measured by DSC. In other words, the ethylene-based copolymer has no crystallinity or is substantially amorphous, as evidenced by the absence of a peak measured by DSC.

In one or more embodiments, the ethylene-based copolymer has no crystallization temperature (Tc) when measured by DSC. In other words, the ethylene-based copolymer has no crystallinity or is substantially amorphous, as evidenced by the absence of a peak measured by DSC.

A "melting peak" would be a peak that occurs as a result of a melting transition and above the material's glass transition temperature (Tg), as determined by DSC. A "melting point" would be the highest peak among principal and secondary melting peaks as determined by DSC during the second melt, discussed above. A "peak" in this context is defined as a change in the general slope of the DSC curve (heat flow versus temperature) from positive to negative forming a maximum without a shift in the baseline where the DSC curve is plotted so that an endothermic reaction would be shown with a positive peak.

The ethylene-based copolymer can have an intermolecular uniformity, such that the ethylene-based copolymers have an intermolecular composition distribution of about 50 wt % or less, or 40 wt % or less, or 30 wt % or less, or 20 wt % or less, or 15 wt % or less, or 10 wt % or less, or 5 wt % or less. The ethylene-based copolymer can have a intramolecular uniformity, such that the ethylene-based copolymers have an intramolecular composition distribution of about 50 wt % or less, or 40 wt % or less, or 30 wt % or less, or 20 wt % or less, or 15 wt % or less, or 10 wt % or less, or 5 wt % or less. In one or more embodiments, the amorphous ethylene-based copolymer has an intramolecular composition distribution of about 15 wt % or less, or an intermolecular composition distribution of about 15 wt % or less, or both an intra-CD and inter-CD of 15 wt % or less.

As used herein, intermolecular composition distribution ("InterCD" or "intermolecular CD"), i.e., a measure of compositional heterogeneity, defines the compositional variation, in terms of ethylene content, among polymer chains. It is expressed as the minimum deviation, analogous to a standard deviation, in terms of weight percent ethylene from the average ethylene composition for a given copolymer sample needed to include a given weight percent of the total copolymer sample which is obtained by excluding equal weight fractions from both ends of the distribution. The deviation need not be symmetrical. When expressed as a single number, for example, an intermolecular composition distribution of 15 wt % shall mean the larger of the positive or negative deviations.

At 50 wt % intermolecular composition distribution, the measurement is similar to conventional Composition Distribution Breadth Index ("CDBI"). As used herein CDBI is defined in U.S. Pat. No. 5,382,630 which is hereby incorporate by reference. CDBI is defined as the weight percent of the copolymer molecules having a comonomer content within 50% of the median total molar comonomer content. The CDBI of a copolymer is readily determined utilizing well known techniques for isolating individual fractions of a sample of the copolymer. One such technique is Temperature Rising Elution Fraction (TREF), as described in Wild, et al., J. Poly. Sci., Poly. Phys. Ed., vol. 20, p. 441 (1982) and U.S. Pat. No. 5,008,204, which can be incorporated herein by reference.

Unlike CDBI, intermolecular composition distribution contemplates weight percent of copolymer content within a smaller range from a median total molar comonomer content, e.g., within 25 wt % of median. For example, for a Gaussian compositional distribution, 95.5% of the polymer, used herein for this example as "Polymer Fraction," is within 20 wt % ethylene of the mean if the standard deviation is 10%. The intermolecular composition distribution for the Polymer Fraction is 20 wt % ethylene for such a sample, i.e., 10% standard deviation yields 20 wt % intermolecular composition distribution.

As used herein intramolecular composition distribution ("IntraCD" or "intramolecular CD") is similar to intermolecular composition distribution, however, IntraCD measures the compositional variation, in terms of ethylene, within a copolymer chain. Intramolecular-CD is expressed as the ratio of alpha-olefin to ethylene along the segments of the same polymer chain.

Compositional heterogeneity both intermolecular-CD and intramolecular-CD can be determined by carbon-13 NMR. Conventional techniques for measuring intermolecular-CD and intramolecular-CD can be described in MACROMOLECULES, H. N. Cheng, Masahiro Kakugo, entitled "Carbon-13 NMR analysis of compositional heterogeneity in ethylene-propylene copolymers," 24 (8), pp 1724-1726, (1991), and in the publication MACROMOLECULES, C. Cozewith, entitled "Interpretation of carbon-13 NMR sequence distribution for ethylene-propylene copolymers made with heterogeneous catalysts," 20 (6), pp 1237-1244, (1987), each of which is herein incorporated by reference in its entirety.

Generally, conventional carbon-13 NMR measurement of diad and triad distribution is used to characterize the ethylene-based copolymer. Any conventional technique for measuring carbon-13 NMR can be utilized. For example, ethylene-based copolymer samples can be dissolved in a solvent, e.g., trichlorobenzene at 4.5 wt % concentration. The Carbon-13 NMR spectra can be obtained at elevated temperature, e.g., 140° C., on a NMR spectrometer at 100 MHz. An exemplary spectrometer is a pulsed Fourier transform Varian XL-400 NMR spectrometer. Deuteriated o-dichlorobenezene is placed in a coaxial tube to maintain an internal lock signal. The following instrument conditions can be utilized: pulse angle, 75°; pulse delay, 25 s; acquisition time, 0.5 s, sweep width, 16000 Hz. The carbon-13 NMR peak can be determined by spectral integration. Diad and triad concentrations can be calculated from the equations presented in MACROMOLECULES, Kakugo et. al., 15, 1150-1152, (1982), which is herein incorporated by reference in its entirety. The diad and triad concentrations can be normalized to give a mole fraction distribution. Polymer composition can be calculated form the methane peaks, the methylene peaks, and the diad balance. These values can be considered individually or an average of the three values can be utilized. Unless stated otherwise, this application utilizes an average of these three values. The results can then be compared to conventional model equations as disclosed in the above references.

One aspect of these measurements involves the determination of the reactivity ratios ($r_1 r_2$) of the polymerization system for the ethylene-based polymers. Polymers which have a compositional heterogeneity, either intramolecular or intermolecular, have a much larger reactivity ratio than the polymers which have only a small or negligible amount.

Without being limited to theory or one method of calculation, it is believed that an one exemplary model for, so called ideal copolymerizations, is described by the terminal copolymerization model:

$$m = M(r_1 M + 1)/(r_2 + M) \quad (1)$$

Wherein $r_1$ and $r_2$ can be the reactivity ratios, m is the ratio of monomers in the copolymer, $m_1/m_2$, M is the ratio of monomers in the reactor, $M_1/M_2$, and the diad and triad concentrations follow first order Markov statistics. For this model, nine equations can be derived that related to the diad and triad concentrations $P_{12}$ and $P_{21}$, the probability of propylene adding to an ethylene-ended chain, and the probability of propylene adding to a propylene-ended chain, respectively. Thus a fit of carbon-13 NMR data to these equations yields $P_{12}$ and $P_{21}$ as the model parameters from which $r_1$ and $r_2$ can be obtained from the relationships:

$$r_1 M = (1 - P_{12})/P_{12}$$

$$r_2/M = (1 - P_{21})/P_{21}$$

The corresponding equations for random copolymerizations with $r_1 r_2 = 1$ can also be used to simplify equation (1), above, to $m = r_1 M$. The ethylene fraction in the polymer, E, is equal to $1 - P_{12}$. This allows the diad and triad equations to be written in terms of polymer composition:

$$EE = E^2$$

$$EE = 2E(1-E)$$

$$PP = (1-E)^2$$

$$EEE = E^3$$

$$EEP = 2E^2(1-E)$$

$$EPE = E^2(1-E)$$

$$PEP = E(1-E)^2$$

$$PPE = 2E(1-E)^2$$

$$PPP = (1-E)^3$$

Variations and extensions of these equations can be provided in the references discussed above, including use of catalysts with different active sites, equations for estimating the number of catalyst species present, or complex models such as those with three or more species present, etc.

From these modeling equations, and those equations presented by MACROMOLECULES, C. Cozewith, Ver Strate, 4, 482-489, (1971), which is herein incorporated by reference in its entirety, the average values of $r_1$, $r_2$, and $r_1 r_2$ arising from the copolymerization kinetics can be given by:

$$\bar{r}_1 = (\Sigma r_{1i} f_i / G_i)/(\Sigma f_i / G_i)$$

$$\bar{r}_2 = (\Sigma r_{2i} f_i / G_i)/(\Sigma f_i / G_i)$$

$$\overline{r_1 r_2} = (\Sigma r_{1i} f_i / G_i)(\Sigma r_{2i} f_i / G_i)/(\Sigma f_i / G_i)^2$$

where $G_i = r_{1i} M \pm 2 + r_{2i}/M$

These equations and the models presented in the references cited above can be utilized by those skilled in the art to characterize the ethylene-based copolymer composition distribution.

Techniques for measuring intramolecular-CD can be found in MACROMOLECULES, Randall, James C., 11(1), 33-36, (1978), MACROMOLECULES, Cheng, H. N., 17(10), 1950-1955, (1984), and MACROMOLECULES, Ray, G. Joseph, Johnson, Paul E., and Knox, Jack R., 10(4), 773-778, (1977), and U.S. Pat. No. 7,232,871, each of which is incorporated by reference in its entirety. Such techniques can be readily known to those skilled in the art of analyzing and characterizing olefin polymers.

In one or more embodiments, the ethylene-based copolymer can have a substantially linear structure, meaning no greater than one branch point, pendant with a carbon chain larger than 19 carbon atoms, per 200 carbon atoms along the polymer backbone. In some embodiments, substantially linear ethylene-based copolymers can be further characterized as having (a) less than 1 branch point, pendant with a carbon chain longer than 10 carbon atoms, per 200 carbon atoms along a polymer backbone, or less than 1 branch point per 300 carbon atoms, or less than 1 branch point per 500 carbon atoms and preferably less than 1 branch point per 1000 carbon atoms, notwithstanding the presence of branch points due to incorporation of the comonomer; and/or (b) no greater than one branch point, pendant with a carbon chain larger than 19 carbon atoms per 300 carbon atoms, or no greater than one per 500 carbon atoms, or no greater one per 1000 carbon atoms, or no greater than one per 2000 carbon atoms.

The number of branch points can be determined by measuring the radius of gyration of polymers as a function of the molecular weight by the methods of size exclusion chromatography augmented by laser light scattering. These procedures can be further described in the publications "A Study of the Separation Principle in Size Exclusion Chromatography" by T Sun, R. R. Chance, W. W. Graessley and D. J Lohse in the journal *Macromolecules,* 2004, 37 (11), pp 4304-4312 and "Effect of Short Chain Branching on the Coil Dimensions of Polyolefins in Dilute Solution" by T Sun, R. R. Chance, W. W. Graessley and P. Brant in the journal *Macromolecules,* 2001, 34(19), pp 6812-6820 which can be both incorporated by reference.

Branching in ethylene-based copolymers can also be described by the ratio of the TE to the MFR@230° C. measured at a load of 2.16 Kg. High values of this parameter indicate low levels of branching while low levels indicate substantial levels of branching.

In one or more embodiments, the ethylene-based copolymers can be grafted, contain a grafted ethylene-based copolymer, or can be part of a composition that is grafted. Typical grafting techniques can be known to those skilled in the art, such techniques using maleic acid. In one or more embodiments, the ethylene-based copolymers can be derivatized.

In one or more embodiments, two or more ethylene-based copolymers can be combined to form compositionally disperse polymeric compositions. Compositionally disperse polymeric compositions is described with more detail in U.S.

Provisional Patent App. No. 61/173,501, entitled Polymeric Compositions Useful as Rheology Modifiers, bearing attorney docket number 2009EM082-PRV, which was filed on Apr. 28, 2009. Accordingly, the ethylene-based copolymer is blended with other components, e.g., additional ethylene-based polymers and/or additives, to form compositionally disperse polymeric compositions.

In one or more embodiments, two or more ethylene-based copolymers can be combined to form crystallinity dispersed polymeric compositions. Crystallinity dispersed polymeric compositions is described with more detail in U.S. Provisional Patent App. No. 61/173,501, entitled Polymeric Compositions Useful as Rheology Modifiers, bearing attorney docket number 2009EM082-PRV, which was filed on Apr. 28, 2009. Accordingly, the ethylene-based copolymer is blended with other components, e.g., additional ethylene-based polymers and/or additives, to form compositionally disperse polymeric compositions.

In one or more embodiments, the amorphous ethylene-based copolymer have an MFR (230° C., 2.16 kg) of from about 3 g/10 min to about 25 g/10 min. The MFR can range from about 5.0 g/10 min to about 15 g/10 min; about 5.0 g/10 min to about 10.0 g/10 min; or about 6.0 g/10 min to about 12 g/10 min. In one or more embodiments, the MFR of the ethylene-based copolymer can range from a low of about 3.0 g/10 min, 4.0 g/10 min, or 5.0 g/10 min to a high of about 10 g/10 min, 15 g/10 min, or 25 g/10 min. In one or more embodiments, the MFR of the ethylene-based copolymer can range from a low of about 5.0 g/10 min, 6.0 g/10 min, or 7.5 g/10 min to a high of about 10 g/10 min, 12 g/10 min, or 15 g/10 min. In one or more embodiments, the MFR of the ethylene-based copolymer can range from a low of about 5.8 g/10 min, 6.0 g/10 min, or 7.0 g/10 min to a high of about 7.5 g/10 min, 8.8 g/10 min, or 9.8 g/10 min. In at least one specific embodiment, the MFR can be of from about 5.8 g/10 min to about 7.8 g/10 min.

Methods for Preparing Ethylene-Based Copolymers

The ethylene-based copolymer can be a single reactor-grade polymer, an interpolymer, i.e., a reactor blend of one or more copolymers, or a post-reactor blend of one or more copolymers, i.e., either via blending pellets or otherwise. Preferably, the ethylene-based copolymer is prepared by copolymerizing ethylene and one or more comonomers in the presence of one or more catalysts or catalyst systems in one or more reactors. Thus, such methods contemplate the use of two or more reactors to prepare a single ethylene-based copolymer, or two or more reactors that can be used to prepare two or more ethylene-based copolymers that can be blended during or after polymerization.

In a preferred embodiment, the ethylene-based copolymer is polymerized in a single well stirred tank reactor in solution where the viscosity of the solution during polymerization is less than 10,000 cps, or less than 7,000 cps, and preferably less than 500 cps. The reactor is preferably liquid filled, continuous flow, stirred tank reactors providing full back mixing for random copolymer production. Solvent, monomers, and catalyst can be fed to the reactor. When two or more reactors can be utilized, solvent, monomers, and/or catalyst is fed to the first reactor or to one or more additional reactors. A preferred solvent is hexane, more preferably isohexane, n-hexane, or mixtures thereof.

Preferably, the linearity of the ethylene-based copolymers is preserved during polymerization. Branching is introduced by the choice of polymerization catalysts, process condition as the choice of the transfer agent. High polymerization temperatures lead to branched polymers as does the use of thermally induced transfer.

The copolymerization process may occur with or without hydrogen present. However, hydrogen is a preferred chain transfer agent because it inhibits branching in the copolymers since it leads to chain ends which can be completely or substantially saturated. Without being limited by theory, it is believed that these saturated polymers cannot participate in the principal branching pathway where preformed polymers with unsaturated chain ends can be reincorporated into new growing chains which lead to branched polymers. Lower polymerization temperatures also lead to lower branching since the formation of chains with unsaturated ends is inhibited by lower scission processes.

Catalyst System

The term "catalyst system" refers to a catalyst precursor/activator pair. When "catalyst system" is used to describe such a pair before activation, it means the unactivated catalyst (precatalyst) together with an activator and, optionally, a co-activator. When it is used to describe such a pair after activation, it means the activated catalyst and the activator or other charge-balancing moiety. The transition metal compound or complex can be neutral as in a precatalyst, or a charged species with a counter ion as in an activated catalyst system. The term "catalyst-system" can also include more than one catalyst precursor and or more than one activator and optionally a co-activator. Likewise, the term "catalyst-system" can also include more that one activated catalyst and one or more activator or other charge-balancing moiety, and optionally a co-activator.

Catalyst precursor is also often referred to as precatalyst, catalyst, catalyst compound, transition metal compound or transition metal complex. These words can be used interchangeably. Activator and cocatalyst (or co-catalyst) can be also used interchangeably. A scavenger is a compound that is typically added to facilitate polymerization by scavenging impurities. Some scavengers may also act as activators and can be referred to as co-activators. A co-activator that is not a scavenger may also be used in conjunction with an activator in order to form an active catalyst. In some embodiments a co-activator can be pre-mixed with the transition metal compound to form an alkylated transition metal compound.

An activator or cocatalyst is a compound or mixture of compounds capable of activating a precatalyst to form an activated catalyst. The activator can be a neutral compound (Lewis acid activator) such as tris-perfluorophenyl boron or tris-perfluorophenyl aluminum, or an ionic compound (Ionic activator) such as dimethylanilinium tetrakis-perfluorophenyl borate or dimethylanilinium tetrakis-perfluoronaphthyl borate. Activators can be also commonly referred to as non-coordinating anion activators or ionic activators owing to the commonly held belief by those skilled in the art, that the reaction of the activator with the precatalyst forms a cationic metal complex and an anionic non-coordinating or weekly coordinating anion (NCA).

Catalyst

Although any conventional catalyst can be used to prepare be ethylene-based copolymers, preferably polymerization takes place in the presence of a metallocene catalyst. The term "metallocene," "metallocene precatalysts," and "metallocene catalyst precursor," as used herein, shall be understood to refer to compounds possessing a transition metal M, with cyclopentadienyl (Cp) ligands, at least one non-cyclopentadienyl-derived ligand X, and zero or one heteroatom-containing ligand Y, the ligands being coordinated to M and corresponding in number to the valence thereof. The metallocene catalyst precursors can be generally neutral complexes but when activated with a suitable co-catalyst yield an active metallocene catalyst which refers generally to an organometallic complex with a vacant coordination site that can coordinate, insert, and polymerize olefins. The metallocene catalyst precursor is preferably one of, or a mixture of metallocene compounds of either or both of the following types: (1) Cyclopentadienyl (Cp) complexes which have two Cp ring systems for ligands (also referred to as a bis-Cp or bis-Cp complex), and (2) Monocyclopentadienyl complexes which have only one Cp ring system as a ligand (also referred to as a mono-Cp or mono-Cp complex).

Cyclopentadienyl (Cp) complexes of the first type, i.e., group 1, have two Cp ring systems for ligands that form a sandwich complex with the metal and can be free to rotate (unbridged) or locked into a rigid configuration through a bridging group. The Cp ring ligands can be like or unlike, unsubstituted, substituted, or a derivative thereof such as a heterocyclic ring system which can be substituted, and the substitutions can be fused to form other saturated or unsaturated rings systems such as tetrahydroindenyl, indenyl, or fluorenyl ring systems. These cyclopentadienyl complexes have the general formula:

$$(Cp^1R^1_m)R^3_n(Cp^2R^2_p)MX_q$$

wherein $Cp^1$ of ligand $(Cp^1R^1_m)$ and $Cp^1$ of ligand $(Cp^2R^2_p)$ can be the same or different cyclopentadienyl rings $R^1$ and $R^2$ each is, independently, a halogen or a hydrocarbyl, halocarbyl, hydrocarbyl-substituted organometalloid or halocarbyl-substituted organometalloid group containing up to about 20 carbon atoms, m is 0 to 5, p is 0 to 5, and two $R_1$ and/or $R_2$ substituents on adjacent carbon atoms of the cyclopentadienyl ring associated there with can be joined together to form a ring containing from 4 to about 20 carbon atoms, $R^3$ is a bridging group, n is the number of atoms in the direct chain between the two ligands and is an integer from 0 to 8, preferably 0 to 3 (where 0 indicates the absence of the bridging group), M is a transition metal having a valence of from 3 to 6, preferably from group 4, 5, or 6 of the periodic table of the elements and is preferably in its highest oxidation state, each X is a non-cyclopentadienyl ligand and is, independently, a halogen or a hydride, or a hydrocarbyl, oxyhydrocarbyl, halocarbyl, hydrocarbyl-substituted organometalloid, oxyhydrocarbyl-substituted organometalloid or halocarbyl-substituted organometalloid group containing up to about 20 carbon atoms, q is equal to the valence of M minus 2.

The Cp ligand in monocyclopentadienyl complexes which have only one Cp ring system, i.e. group 2, forms a half-sandwich complex with the metal and can be free to rotate (unbridged) or locked into a rigid configuration through a bridging group to a heteroatom-containing ligand. The Cp ring ligand can be unsubstituted, substituted, or a derivative thereof such as a heterocyclic ring system which can be substituted, and the substitutions can be fused to form other saturated or unsaturated rings systems such as tetrahydroindenyl, indenyl, or fluorenyl ring systems. The heteroatom containing ligand is bound to both the metal and optionally to the Cp ligand through the bridging group. The heteroatom itself is an atom with a coordination number of three from group VA or a coordination number of two from group VIA of the periodic table of the elements. These mono-cyclopentadienyl complexes have the general formula:

$$(Cp^1R^1_m)R^3_n(YR^2_r)MX_s$$

wherein $R^1$ is, each independently, a halogen or a hydrocarbyl, halocarbyl, hydrocarbyl-substituted organometalloid or halocarbyl-substituted organometalloid group containing up to about 20 carbon atoms, "m" is 0 to 5, and two $R_1$ substituents on adjacent carbon atoms of the cyclopentadienyl ring associated there with can be joined together to form a ring containing from 4 to about 20 carbon atoms, $R^3$ is a bridging group, "n" is an integer from 0 to 3 (where 0 indicates the absence of the bridging group), M is a transition metal having a valence of from 3 to 6, preferably from group 4, 5, or 6 of the periodic table of the elements and is preferably in its highest oxidation state, Y is a heteroatom containing group in which the heteroatom is an element with a coordination number of three from Group VA or a coordination number of two from group VIA preferably nitrogen, phosphorous, oxygen, or sulfur, r is 1 when Y has a coordination number of three and n is not 0 or when Y has a coordination number of two and n is 0, r is 2 when Y has a coordination number of three and n is 0, or r is 0 (meaning $R^2$ is absent) when Y has a coordination number of two and n is not 0, $R^2$ is a radical selected from a group consisting of $C_1$ to $C_{20}$ hydrocarbyl radicals, substituted $C_1$ to $C_{20}$ hydrocarbyl radicals, wherein one or more hydrogen atoms is replaced with a halogen atom, and each X is a non-cyclopentadienyl ligand and is, independently, a halogen, a hydride, or a hydrocarbyl, oxyhydrocarbyl, halocarbyl, hydrocarbyl-substituted organometalloid, oxyhydrocarbyl-substituted organometalloid or halocarbyl-substituted organometalloid group containing up to about 20 carbon atoms, "s" is equal to the valence of M minus 2. In a preferred embodiment, the catalyst utilized is a di(p-triethylsilylphenyl)methenyl[(cyclopentadienyl)(2,7-di-tert-butylfluoren-9-yl)]hafnium dimethyl.

Examples of suitable biscyclopentadienyl metallocenes of the type described in group 1 above can be disclosed in U.S. Pat. Nos. 5,324,800, 5,198,401, 5,278,119, 5,387,568, 5,120,867, 5,017,714, 4,871,705, 4,542,199, 4,752,597, 5,132,262, 5,391,629, 5,243,001, 5,278,264, 5,296,434, and 5,304,614, each of which is incorporated by reference herein in its entirety.

In one or more embodiments, copolymerization techniques utilize more than one catalyst, i.e., two or more bis-Cp catalysts, or two or more mono-Cp catalysts, or one or more bis-Cp catalysts with one or more mono-Cp catalysts.

Activators

The catalyst precursors can also be activated with one or more cocatalysts, activators, Lewis acid activators, or any combination thereof. Preferred ionic activators can include one or more non-coordinating anions. The term "noncoordinating anion" (NCA) means an anion which either does not coordinate to said transition metal cation or which is only weakly coordinated to said cation thereby remaining sufficiently labile to be displaced by a neutral Lewis base. "Compatible" noncoordinating anions can be those which can be not degraded to neutrality when the initially formed complex decomposes. Further, the anion will not transfer an anionic substituents or fragment to the cation so as to cause it to form a neutral four coordinate metallocene compound and a neutral by-product from the anion. Noncoordinating anions useful in for the purposes herein can be those which can be compatible, stabilize the metallocene cation in the sense of balancing its ionic charge in a+1 state, and yet retain sufficient lability to permit displacement by an ethylenically or acetylenically unsaturated monomer during polymerization. Additionally, the anions useful for the purposes herein will be large or bulky in the sense of sufficient molecular size to largely inhibit or prevent neutralization of the metallocene cation by Lewis bases other than the polymerizable monomers that can be present in the polymerization process. Typically the anion will have a molecular size of greater than or equal to about 4 angstroms. NCA's can be preferred because of their ability to produce a target molecular weight polymer at a higher temperature than tends to be the case with other activation systems such as alumoxane.

Descriptions of ionic catalysts for coordination polymerization using metallocene cations activated by non-coordinating anions appear in EP-A-0 277 003, EP-A-0 277 004, WO92/00333, and U.S. Pat. Nos. 5,198,401, and 5,278,119, each of which can be herein incorporated by reference in their entirety. These references teach a preferred method of preparation wherein metallocenes (bis Cp and mono Cp) can be protonated by an anionic precursors such that an alkyl/hydride group is abstracted from a transition metal to make it both cationic and charge-balanced by the non-coordinating anion. The use of ionizing ionic compounds not containing an active proton but capable of producing both the active metallocene cation and a noncoordinating anion can be also known. See, e.g., EP-A-0 426 637, EP-A-0 573 403 and U.S. Pat. No. 5,387,568, each of which can be herein incorporated by reference in their entirety. Reactive cations other than Bronsted acids capable of ionizing the metallocene compounds include ferrocenium triphenylcarbonium and triethylsilylinium cations.

Any metal or metalloid capable of forming a coordination complex which is resistant to degradation by water (or other Bronsted or Lewis Acids) can be used or contained in the anion of the second activator compound. Suitable metals include, but can be not limited to, aluminum, gold, platinum and the like. Suitable metalloids include, but can be not limited to, boron, phosphorus, silicon and the like.

An additional method of making the ionic catalysts uses ionizing anionic pre-cursors (Lewis acid activators) which can be initially neutral Lewis acids but form the cation and anion upon ionizing reaction with the metallocene compounds, for example tris(pentafluorophenyl) boron acts to abstract an alkyl, hydride or silyl ligand to yield a metallocene cation and stabilizing non-coordinating anion, see, e.g., EP-A-0 427 697 and EP-A-0 520 732, each of which can be herein incorporated by reference in their entirety. Ionic catalysts for addition polymerization can also be prepared bed by oxidation of the metal centers of transition metal compounds by anionic precursors containing metallic oxidizing groups along with the anion groups, see EP-A-0 495 375, which is herein incorporated by reference in its entirety.

Where the metal ligands include halide moieties, for example, (methyl-phenyl)silylene (tetramethylcyclopentadienyl)(tert-buty-amido) zirconium dichloride), which can be not capable of ionizing abstraction under standard conditions, they can be converted via known alkylation reactions with organometallic compounds such as lithium or aluminum hydrides or alkyls, alkylalumoxanes, Grignard reagents, etc. Processes describing the reaction of alkyl aluminum compounds with dihalide substituted metallocene compounds prior to or with the addition of activating anionic compounds can be found in EP-A-0 500 944, EP-A1-0 570 982, and EP-A1-0 612 768, each of which can be herein incorporated by reference in their entirety. For example, an aluminum alkyl compound can be mixed with the metallocene prior to its introduction into the reaction vessel. Since the alkyl aluminum is also suitable as a scavenger its use in excess of that normally stoichiometrically required for alkylation of the metallocene will permit its addition to the reaction solvent with the metallocene compound. Normally alumoxane would not be added with the metallocene so as to avoid premature activation, but can be added directly to the reaction vessel in the presence of the polymerizable monomers when serving as both scavenger and alkylating activator. Alumoxanes may also fulfill a scavenging function.

Similarly, a co-activator is a compound capable of alkylating the transition metal complex, such that when used in combination with an activator, an active catalyst is formed. Co-activators include alumoxanes such as methyl alumoxane, modified alumoxanes such as modified methyl alumoxane, and aluminum alkyls such trimethyl aluminum, tri-isobutyl aluminum, triethyl aluminum, and tri-isopropyl aluminum. Co-activators can be typically used in combination with Lewis acid activators and Ionic activators when the pre-catalyst is not a dihydrocarbyl or dihydride complex.

Known alkylalumoxanes can be additionally suitable as catalyst activators, particularly for those metallocenes comprising halide ligands. The alumoxane component useful as catalyst activator typically is an oligomeric aluminum compound represented by the general formula $(R-Al-O)_n$, which is a cyclic compound, or $R(R-Al-O)_n AlR_2$, which is a linear compound. In the general alumoxane formula R is a $C_1$ to $C_5$ alkyl radical, for example, methyl, ethyl, propyl, butyl or pentyl and "n" is an integer from 1 to about 50. Most preferably, R is methyl and "n" is at least 4, i.e., methylalumoxane (MAO). Alumoxanes can be prepare bed by various procedures known in the art. For example, an aluminum alkyl can be treated with water dissolved in an inert organic solvent, or it can be contacted with a hydrated salt, such as hydrated copper sulfate suspended in an inert organic solvent, to yield an alumoxane. Generally, however prepare bed, the reaction of an aluminum alkyl with a limited amount of water yields a mixture of the linear and cyclic species of the alumoxane.

FIG. 1 depicts an illustrative solution polymerization system 100, according to one or more embodiments. Ethylene and one or more comonomers can be fed via line 2 and/or 58 to one or more reactors 8. The feed via line 2 can be first cooled, if necessary, in a first heat exchanger 6. One or more scavengers via line 4 can be introduced to the polymerization feed in line 2, before, after, or during cooling of the polymerization feed in heat exchanger 6. The one or more scavengers can reduce the effect of poisons that may be present in the polymerization feed, such as a reduction in catalytic activity. Illustrative scavengers can be or include an alkyl aluminum, such as tri-isobutyl aluminum or tri-n-octyl aluminum.

The cooled polymerization feed from heat exchanger 6 can be introduced to a pump 3 to provide a pressurized polymerization feed, which can be introduced to one or more stirred tank reactors 8 (only one is shown) to provide a polymer solution via line 11. The pressurized polymerization feed preferably has a pressure of about 9,000 kPa or more.

The one or more stirred tank reactors 8 can be operated in series, parallel, or a combination thereof. The reactors 8 can be a liquid-filled, continuous flow, stirred tank reactor (CF-STR). The one or more stirred tank reactors 8 can be operated adiabatically, except for a small energy input required to operate agitators associated with the one or more stirred tank reactors 8. The specific number and configuration of stirred tank reactors 8 can be based, at least in part, on the grade of polymer that is desired to be produced.

The reactors can be cooled by reactor jackets or cooling coils, autorefrigeration, prechilled feeds or combinations of all three to absorb the heat of the exothermic polymerization reaction. Autorefrigerated reactor cooling requires the presence of a vapor phase in the reactor. Adiabatic reactors with prechilled feeds can be preferred in which the polymerization exotherm is absorbed by permitting a temperature rise of the polymerizing liquid.

Reactor temperature is selected, depending upon the effect of temperature on catalyst deactivation rate and polymer properties and/or extent of monomer depletion. For best monomer conversion, it is desirable to operate at as high a temperature as possible using relatively concentrated polymer solutions.

When using more than one reactor, generally temperatures should not exceed the point at which the concentration of catalyst in the second reactor is insufficient to make the desired polymer component in the desired amount. Therefore, reaction temperature is determined by the details of the catalyst system. In general, a single reactor or first reactor in a series will operate at a reactor temperature from about 0° C. to about 170° C., or from about 20° C. to about 170° C., or from about 40° C. to about 170° C. Preferably, reaction temperatures can be from about 90° C. to about 170° C., or more preferably from about 100° C. to about 170° C. or from about 1000° C. to about 150° C. When using on or more additional reactors, the additional reactor temperature will vary from 40-160° C. in one embodiment, with 60-160° C. in another embodiment, and 60-120° C. in yet another embodiment.

Reaction pressure is determined by the details of the catalyst system. In general reactors, whether a single reactor or each of a series of reactors, operates at a reactor pressure of less than 600 pounds per square inch (psi), or less than 500 psi or less than 400 psi, or less than 300 psi. Preferably, reactor pressure is from about atmospheric pressure to about 400 psi, or from about 200 psi to about 350 psi, or from about 300 psi to about 375 psi. Ranges from any of the recited lower limits to any of the recited upper limits can be contemplated by the inventors and within the scope of the present description.

In the case of less stable catalysts, catalyst can also be fed to a second reactor when the selected process uses reactors in series. Optimal temperatures can be achieved, particularly for series operation with progressively increasing polymerization temperature, by using bis-cyclopentadienyl catalyst systems containing hafnium as the transition metal, especially those having a covalent, single atom bridge coupling the two cyclopentadienyl rings.

Particular reactor configurations and processes suitable for use in the processes described herein can be found in more detail in U.S. patent application Ser. No. 09/260,787 issued as U.S. Pat. No. 6,319,998 on Nov. 20, 2001 and U.S. patent application Ser. No. 60/243,192, filed Oct. 25, 2000.

Still referring to FIG. 1, one or more activators and metallocene catalysts via line 5 can be introduced to the stirred tank reactors 8. The one or more activators and metallocene catalysts can be independently introduced to the stirred tank reactors 8 via separate lines (not shown). Hydrogen via line 7 can optionally be introduced to the one or more of the stirred tank reactors 8. In addition to controlling the polymerization temperature within the one or more stirred tank reactors 8, the hydrogen introduced via line 7 can be used to further control the molecular weight of the polymer recovered via line 11 from the stirred tank reactors 8.

The polymer solution recovered via line 11 can include polymer product, solvent, and unreacted monomers. The polymer concentration of the polymer solution in line 11 can range from a low of about 3 wt %, about 4 wt %, or about 5 wt % to a high of about 9 wt %, 10 wt %, or 12 wt %. For example, the polymer concentration can range from about 6 wt % to about 11 wt %. The balance of the polymer solution can be composed of solvent, dissolved monomers, comonomers, catalyst particles, and impurities. A preferred solvent is hexane, more preferably isohexane, n-hexane, or mixtures thereof.

A catalyst deactivator or "catalyst killer," e.g. water, via line 10 can be introduced to the polymer solution in line 11. The catalyst deactivator can terminate the polymerization reaction to provide a catalyst deactivated solution (deactivated solution). The deactivated solution can be introduced to a second heat exchanger 12, wherein the deactivated solution can be indirectly heated to provide a first heated solution. If the first heated solution requires additional heating, such additional heating can be indirectly provided via a third heat exchanger 16. The heat transfer medium can be or include steam, hot oil, hot water or any other suitable heat transfer medium. The first heated solution, or after subsequent heating, the second heated solution can be introduced to the first separator 14, where it is separated into a polymer lean phase "lean phase" 20 and a polymer rich phase 22 within the separator 14. The upper or lean phase 20 can be used to indirectly heat the deactivated solution via line 11 prior to entering the separator 14. A pressure reduction device 18 can be used to facilitate the phase separation within the separator 14.

The lean phase 20 can be introduced to a surge tank 26 via line 27. The surge tank 26 can be adapted to strip hydrogen that may be contained in the lean phase to provide a hydrogen lean solvent via line 43 and a vapor via line 44. The hydrogen lean solvent via line 43 can contain less than about 3 wt % hydrogen, less than about 1 wt % hydrogen, less than about 0.5 wt % hydrogen, less than about 0.1 wt % hydrogen.

The surge tank 26 can be any vessel suitable for stripping or otherwise removing hydrogen. A stripping medium via line 25 can be introduced to the surge tank 26. The stripping medium can include, but is not limited to, ethylene or propylene. The surge tank 26 can further include clean out or drain line 28. An illustrative surge tank 26 suitable for the polymerization system 100 can be one as described in U.S. Pat. No. 6,881,800.

The hydrogen lean solvent via line 43 can be introduced to a fourth heat exchanger 24, wherein the temperature of the hydrogen lean solvent can be adjusted. For example, the heat exchanger 24 can cool the hydrogen lean solvent. The hydrogen lean solvent in line 43 can be combined with a fresh solvent and monomer introduced via line 30 to provide the desired solvent, monomer, and other component concentrations, which can be introduced to a drier 32. The drier 32 can remove at least a portion of any unreacted water used as the catalyst killer, present in the fresh feed in line 30, or otherwise present as an impurity in the hydrogen lean solvent to provide at least a portion of the polymerization feed introduced via line 2 to the reactors(s) 8. Although not shown, in one or more embodiments, the hydrogen lean solvent via line 43 can be introduced to one or more storage tanks that can facilitate inventory control within the polymerization system 100.

The vapor via line 44 can be introduced to a reflux drum 39 of a fractionation tower 36. The vapor in line 44 can be processed to recover valuable components. For example, volatile monomers such as ethylene and propylene via line 63 can be recovered from the vapor in line 44 via a second separator 61. The recovered monomers and other components can be recycled to the surge tank 26 via line 63, and any non-desirable, non-condensing gases, such as hydrogen can be disposed of via line 112. The recycled monomers and other components introduced to the surge tank 26 via line 63 can be separated and recovered with the hydrogen lean solvent via line 43 and recycled as the to the one or more reactors 8 with the polymerization feed 2.

In a single stirred tank reactor 8 and in series of stirred tank reactor 8 arrangements using metallocene catalysts systems, varying amounts of hydrogen may be produced by beta-hydride abstraction, even when no hydrogen via line 7 is injected into the stirred tank reactor(s) 8. The amount of hydrogen produced within the one or more stirred tank reactors 8 can vary with the particular metallocene catalyst(s) selected. The molecular weight reducing effect hydrogen can have on the polymerization reactions occurring within the one or more stirred tank reactors 8 can be accounted for by an appropriate selection of the stirred tank reactor 8 operating temperature. A substantial amount of hydrogen, either introduced via line 7 or produced within the one or more stirred tank reactors 8, can remain unreacted in the polymer solution recovered via line 11. As such, reducing the amount of hydrogen recycled via the hydrogen lean solvent in line 43 can be advantageous to permit adjustment of the molecular weight independent from the polymerization reaction operating temperature.

In two or more serially arranged stirred tank reactors 8, the ability to remove hydrogen can be improved, which can widen or increase the molecular weight split in polymer products produced in the serially arranged stirred tank reactors 8; thereby broadening the molecular weight distribution of a polymer product. For example a first reactor 8, located upstream from a serially arranged second reactor 8, can have a hydrogen content below that which would prevail if hydrogen generated by beta hydride elimination remained in the recycle. Additional extraneous hydrogen can be added to the downstream reactor 8 via line 7 to provide a hydrogen content above that which would remain if hydrogen from beta hydride elimination were to remain in the recycle.

As such, sufficient removal of the hydrogen from the lean phase in line 27 can provide a process system 100 that enables an increase in the range of bimodal compositions that can be produced within the one or more stirred tank reactors 8. Sufficient removal of hydrogen from the lean phase in line 27 also permits the selection of a broader range of metallocene catalyst systems regardless of the catalyst's tendency to generate hydrogen through beta hydride elimination or the catalyst's sensitivity to the presence of hydrogen in the polymerization mixture.

Referring again to the polymer rich phase 22 provided in separator 14; the rich phase 22 can be introduced to a third or "low-pressure" separator 33 which can provide an evaporated solvent and monomer overhead via line 35 and a more concentrated polymer or bottoms 34. The evaporated solvent and monomer overhead via line 35 can be introduced, in the vapor phase, to the fractionation tower 36. The fractionation tower 36 can distill or otherwise selectively separate a light fraction recovered as an overhead via line 51 and a heavy fraction recovered as bottoms via line 52. The light fraction can include monomers, such as ethylene and propylene, which can be recycled via line 53 to the surge tank 26. The monomers and other polymerization feed components can be separated within the surge tank 26 and recovered with the hydrogen lean solvent via line 43.

In one or more embodiments, any diene in the evaporated solvent and monomer overhead can be introduced via line 35 to the fractionation tower 36. A substantial portion of any diene present in the evaporated solvent and monomer overhead in line 35 can be recovered via line 38 as a bottoms from the fractionation tower 36. As such, the amount of diene present within the overhead 37 recovered from the fractionation tower 36 can be less than about 1 wt %, less than about 0.1 wt %, less than about 0.05 wt %, or less than about 0.01 wt %. As such, the volatile monomers such as ethylene and propylene recovered via line 63 from the second separator 61 can be lean in diene. The low amount of diene can allow the recovered monomers in line 63 to be recycled to the surge tank 26 without concern for cross-contamination between different types and/or grades of polymer produced using the polymerization system 100.

In one or more embodiments, a gear pump 38 can be used to convey the concentrated polymer 34 to a vacuum devolatilizing extruder or mixer 40. The vacuum devolatilizing extruder 40 can provide a separated vapor phase via line 41 and a polymer melt can be recovered via outlet 42. The vapor phase via line 41 can be purified, condensed, and then introduced to the purification tower 50.

The purification tower 50 can also recover intermediate fractions containing any diene such as the ENB comonomer and/or octene-1 comonomer via line 54 from the purification tower 50. The ENB and/or octene-1 comonomer via line 54 can be introduced to one or more storage vessels 55, 56, which can be stored for later use. Storing the ENB and/or octene-1 comonomer, either separately or together, can facilitate product transitions between different product families, e.g. EP(D)M and EO plastomers, while still enabling eventual recovery of the valuable unreacted comonomers.

The polymer melt recovered via outlet 42 from the vacuum devolatilizing extruder 40 can be pelletized in an underwater pelletizer 46, fed with water chilled in a chiller 47, and washed and spun dried in a washer/dryer 48 to provide pellets suitable for bagging or baling via outlet 49.

Uses

The ethylene-based copolymers can be useful as rheology modifying compositions. Accordingly, ethylene-based polymer compositions can be used independently to modify rheology in hydrocarbon compositions, such as lubricating oils. Alternatively, ethylene-based copolymers can be combined with conventional additives to modify the rheology of hydrocarbon compositions. Illustrative conventional additives include olefin-based additives, or mineral based additives, each of which is know to those skilled in the art.

The ethylene-based copolymers can also be useful as blend components in conventional polymer compositions, e.g., ethylene homopolymers or copolymers, or propylene homopolymers or copolymers, and in thermoplastic vulcanizates ("TPV"). Further, such ethylene-based copolymers can be useful as additives or primary components in molded articles, extrudates, films, e.g., blown films, etc., woven and nonwoven fabrics, adhesives, and conventional elastomer applications.

Further embodiments of compositions and methods for making the same are provided:

1. An extruded, copolymer pellet composition, comprising:
    an ethylene content of about 40 wt % to about 50 wt % and a propylene content of about 50 wt % to about 60 wt %, based on total weight of the copolymer, wherein the copolymer has:
    a MFR (230° C./2.16 kg) of from about 3.0 g/10 min and about 25 g/10 min;
    a MWD (Mw/Mn) of about 2.3 or less; and
    no measurable melting peak, as measured by DSC.
2. The pellet of embodiment 1, wherein the pellet has a length to diameter ratio (L/D) of from about 0.8 to about 1.2.
3. The pellet of embodiment 1 or 2, wherein the pellet has a diameter of about 3.0 mm or more.
4. The pellet of claim 1, wherein the pellet has a diameter of about 3.0 mm or more and a length to diameter ratio (L/D) of from about 0.8 to about 1.2.
5. The pellet of any of embodiments 1-4, further comprising dust in an amount of about 1.0 wt % or less, based on total weight of the copolymer.
6. The pellet of any of embodiments 1-5, further comprising ethylene vinyl acetate (EVA) in an amount of about 1.0 wt % or less, based on total weight of the copolymer.
7. The pellet of any of embodiments 1-6, wherein the MFR is about 5.0 g/10 min to about 15.0 g/10 min.
8. The pellet of any of embodiments 1-6, wherein the MFR is about 5.0 g/10 min to about 10 g/10 min.
9. The pellet of any of embodiments 1-6, wherein the MFR is about 5.8 g/10 min to about 7.8 g/10 min.
10. The pellet of any of embodiments 1-9, wherein the ethylene content is about 43 wt % to about 50 wt %.
11. The pellet of any of embodiments 1-9, wherein the ethylene content is about 43 wt % to about 46 wt %.
12. The pellet of any of embodiments 1-9, wherein the ethylene content is about 46 wt % to about 50 wt %.

13. A method for making a copolymer pellet, comprising:
pelletizing a copolymer comprising a MFR (230° C./2.16 kg) of from about 3.0 g/10 min and about 25 g/10 min; a MWD (Mw/Mn) of about 2.3 or less; and no measurable melting peak, as measured by DSC, to provide at least one pellet having a diameter of about 3.0 mm or more and a length to diameter ratio (L/D) of from about 0.8 to about 1.2; and
dusting the pellet with about 1.0 wt % or less dust, based on total weight of the pellet, wherein the dusted pellet has:
a MFR (230° C./2.16 kg) of from about 3.0 g/10 min and about 10 g/10 min;
a MWD (Mw/Mn) of about 2.3 or less; and
no measurable melting peak, as measured by DSC.
14. The method of embodiment 13, further comprising bagging the pellet.
15. The method of embodiment 13 or 14, further comprising dust in an amount of about 0.8 wt % or less, based on total weight of the copolymer.
16. The method of any of embodiments 13-15, further comprising ethylene vinyl acetate (EVA) in an amount of about 1.0 wt % or less, based on total weight of the copolymer.
17. The method of any of embodiments 13-16, wherein the MFR is about 5.0 g/10 min to about 10 g/10 min.
18. The method of any of embodiments 13-16, wherein the MFR is about 5.8 g/10 min to about 7.8 g/10 min.
19. The method of any of embodiments 13-18, wherein the ethylene content is about 46 wt % to about 48 wt %.
20. The method of any of embodiments 13-18, wherein the ethylene content is about 43 wt % to about 46 wt %.
21. The method of any of embodiments 13-18, wherein the ethylene content is about 46 wt % to about 50 wt %.
22. A method for making a copolymer pellet, comprising:
polymerizing ethylene and propylene in the presence of a catalyst composition at conditions sufficient to produce an ethylene-propylene copolymer comprising an ethylene content of about 40 wt % to about 50 wt % and a propylene content of about 50 wt % to about 60 wt %, based on total weight of the copolymer, wherein the catalyst composition comprises di(p-triethylsilylphenyl)methenyl[cyclopentadienyl)(2,7-di-tert-butylfluoren-9-yl)]hafnium dimethyl and N,N-dimethylanilinium tetrakis(pentafluorophenyl)borate;
pelletizing the copolymer to provide at least one pellet having a diameter of about 3.0 mm or more and a length to diameter ratio (L/D) of from about 0.8 to about 1.2; and
dusting the pellet with about 0.8 wt % or less dust, based on total weight of the pellet, wherein the dusted pellet has:
a MFR (230° C./2.16 kg) of from about 3.0 g/10 min and about 10 g/10 min;
a MWD (Mw/Mn) of about 2.3 or less; and
no measurable melting peak, as measured by DSC.
23. The method of embodiment 22, wherein the ethylene content is about 46 wt % to about 50 wt %.
24. The method of embodiment 22 or 23, wherein the ethylene content is about 46 wt % to about 48 wt %.
25. The method of any of embodiments 22-24, wherein the MFR is about 5.8 g/10 min to about 7.8 g/10 min.
26. An extruded, copolymer pellet composition, comprising:
an ethylene content of about 40 wt % to about 50 wt % and a propylene content of about 50 wt % to about 60 wt %, based on total weight of the copolymer, wherein the copolymer has:
a MFR (230° C./2.16 kg) of from about 3.0 g/10 min and about 25 g/10 min;
a MWD (Mw/Mn) of about 2.3 or less; and
no measurable melting transition, as measured by DSC.
27. The pellet of embodiment 26, wherein the pellet has a length to diameter ratio (L/D) of from about 0.8 to about 1.2.
28. The pellet of embodiment 26 or 27, wherein the pellet has a diameter of about 3.0 mm or more.
29. The pellet of embodiment 26, wherein the pellet has a diameter of about 3.0 mm or more and a length to diameter ratio (L/D) of from about 0.8 to about 1.2.

EXAMPLES

The foregoing discussion can be further described with reference to the following non-limiting examples. Nineteen inventive examples (Examples 1-19) and three comparative examples (Comparative Examples 1-3) are provided and summarized below in Table 1. The inventive examples are produced as follows. The comparative examples correspond, respectively, to Examples 6, 7 and 8 of U.S. Pat. No. 6,589,920.

The polymer compositions of Examples 1-19 were synthesized in a single continuous stirred tank reactor. The polymerization was performed in solution, using hexane as a solvent. In the reactor, polymerization was performed at a temperature of 145° C., an overall pressure of 20 bar with ethylene and propylene feed rates of 1.3 kg/hr and 2 kg/hr, respectively.

Hydrogen addition and temperature control was used to achieve the desired MFR. The catalyst, activated externally to the reactor, was added as needed in amounts effective to maintain the target polymerization temperature. As the catalyst system, N,N-dimethylanilinium tetrakis(pentafluorophenyl)borate was used to activate di(p-triethylsilylphenyl)methenyl[(cyclopentadienyl)(2,7-di-tert-butylfluoren-9-yl)] hafnium dimethyl.

The copolymer solution emerging from the reactor was stopped from further polymerization by addition of water and then devolatilized, first by removing the bulk of the hexane to provide a concentrated solution, and then by stripping the remainder of the solvent in anhydrous conditions using a devolatilizing unit so as to provide a molten polymer composition containing less than 0.5 wt % of solvent and other volatiles. The molten polymer was discharged using a single screw extruder connected to a gear pump. The polymer melt was then pelletized in an underwater pelletizer fed with chilled water having a temperature of about 5° C. using polymer a flow rate and die diameter so that round pellets with a diameter of about 3 mm (+/−0.3 mm) and an L/D of about 1 (+/−0.2) were obtained. The pellets were spun dried, conveyed via fluid bed drying conveyors to a duster and dusted with about 0.5% (+/−0.2%) by weight of an ethylene vinyl acetate copolymer (EVA dust), and further conveyed to a baling unit. The EVA dust contained 14% vinyl acetate, and the EVA dust had an average particle size of 24-50 μm. Table 1 summarizes certain parameters of the polymers produced.

TABLE 1

| Example | MFR (g/10 min) | Ethylene (wt %) | Mn (DRI) (g/mole) | Mw (DRI) (g/mole) | Mz (DRI) (g/mole) | Mw/Mn | Tm (° C., DSC, second heat) |
|---|---|---|---|---|---|---|---|
| Inventive 1 | 6.8 | 44.0 | 42,301 | 93,983 | 163,626 | 2.22 | none |
| Inventive 2 | 6.5 | 44.2 | 43,174 | 93,660 | 162,492 | 2.17 | none |
| Inventive 3 | 7.4 | 44.2 | 43,319 | 93,742 | 163,884 | 2.16 | none |

TABLE 1-continued

| Example | MFR (g/10 min) | Ethylene (wt %) | Mn (DRI) (g/mole) | Mw (DRI) (g/mole) | Mz (DRI) (g/mole) | Mw/Mn | Tm (° C., DSC, second heat) |
|---|---|---|---|---|---|---|---|
| Inventive 4 | 6.2 | 44.3 | — | — | — | — | none |
| Inventive 5 | 5.0 | 44.7 | 46,547 | 99,906 | 159,550 | 2.15 | none |
| Inventive 6 | 5.3 | 44.8 | 43,401 | 96,912 | 168,486 | 2.23 | none |
| Inventive 7 | 6.8 | 44.9 | 39,384 | 95,150 | 177,004 | 2.42 | none |
| Inventive 8 | 6.2 | 45.2 | 41,648 | 92,713 | 159,550 | 2.23 | none |
| Inventive 9 | 5.9 | 45.3 | 43,483 | 96,068 | 166,375 | 2.21 | none |
| Inventive 10 | 6.2 | 45.4 | 45,582 | 93,094 | 161,402 | 2.04 | none |
| Inventive 11 | 6.3 | 45.5 | 43,614 | 95,081 | 165,165 | 2.18 | none |
| Inventive 12 | 5.3 | 45.7 | 44,561 | 97,691 | 168,600 | 2.19 | none |
| Inventive 13 | 5.7 | 45.8 | 44,267 | 96,126 | 167,390 | 2.17 | none |
| Inventive 14 | — | 47.2 | 39,046 | 86,940 | 153,381 | 2.23 | none |
| Inventive 15 | 7.8 | 47.2 | 40,541 | 86,720 | 153,390 | 2.14 | none |
| Inventive 16 | 6.72 | 48.0 | 42,481 | 88,901 | 153,784 | 2.09 | none |
| Inventive 17 | 6.81 | 48.2 | 42,991 | 91,764 | 163,220 | 2.13 | none |
| Inventive 18 | 6.7 | 48.2 | 43,366 | 90,596 | 158,376 | 2.09 | none |
| Inventive 19 | 5.78 | 48.4 | 43,303 | 91,784 | 160,261 | 2.12 | none |
| Comparative 1 | — | 47.2 | — | 196,000 | — | 2.10 | 38.50 |
| Comparative 2 | — | 46.8 | — | 210,000 | — | 2.00 | 36.20 |
| Comparative 3 | — | 49.6 | — | 192,000 | — | 1.80 | 40.80 |

Unless stated otherwise, the following analysis techniques apply to the characterization properties of Table 1.

Melt Flow Rate (MFR) of the polymers was measured according to ASTM D1238 at 230° C., with a 2.16 kg load.

The ethylene content of ethylene/propylene copolymers was determined using FTIR according to the following technique. A thin homogeneous film of polymer, pressed at a temperature of about 150° C., was mounted on a Perkin Elmer Spectrum 2000 infrared spectrophotometer. A full spectrum of the sample from 600 cm$^{-1}$ to 4000 cm$^{-1}$ was recorded and the area under the propylene band at ~1165 cm$^{-1}$ and the area under the ethylene band at ~732 cm$^{-1}$ in the spectrum were calculated. The baseline integration range for the methylene rocking band is nominally from 695 cm$^{-1}$ to the minimum between 745 and 775 cm$^{-1}$. For the polypropylene band the baseline and integration range is nominally from 1195 to 1126 cm$^{-1}$. The ethylene content in wt % was calculated according to the following equation:

ethylene content (wt. %)=72.698−86.495$X$+13.696$X^2$ where $X$=AR/(AR+1) and AR is the ratio of the area for the peak at ~1165 cm$^{-1}$ to the area of the peak at ~732 cm$^{-1}$.

Molecular weight (weight-average molecular weight, $M_w$, number-average molecular weight, $M_n$, and molecular weight distribution, $M_w/M_n$ or MWD) were determined using a High Temperature Size Exclusion Chromatograph (either from Waters Corporation or Polymer Laboratories), equipped with a differential refractive index detector (DRI), an online light scattering (LS) detector, and a viscometer. Experimental details not described below, including how the detectors were calibrated, can be described in: T. Sun, P. Brant, R. R. Chance, and W. W. Graessley, Macromolecules, Volume 34, Number 19, 6812-6820, (2001).

Three Polymer Laboratories PLgel 10 mm Mixed-B columns were used. The nominal flow rate was 0.5 cm$^3$/min, and the nominal injection volume was 300 μL. The various transfer lines, columns and differential refractometer (the DRI detector) were contained in an oven maintained at 145° C. Solvent for the SEC experiment was prepare bed by dissolving 6 grams of butylated hydroxy toluene as an antioxidant in 4 liters of Aldrich reagent grade 1, 2, 4 trichlorobenzene (TCB). The TCB mixture was then filtered through a 0.7 μm glass pre-filter and subsequently through a 0.1 μm Teflon filter. The TCB was then degassed with an online degasser before entering the SEC. Polymer solutions were prepare bed by placing dry polymer in a glass container, adding the desired amount of TCB, then heating the mixture at 160° C. with continuous agitation for about 2 hours. All quantities were measured gravimetrically. The TCB densities used to express the polymer concentration in mass/volume units can be 1.463 g/ml at room temperature and 1.324 g/ml at 145° C. The injection concentration ranged from 1.0 to 2.0 mg/ml, with lower concentrations being used for higher molecular weight samples. Prior to running each sample the DRI detector and the injector were purged. Flow rate in the apparatus was then increased to 0.5 ml/minute, and the DRI was allowed to stabilize for 8-9 hours before injecting the first sample. The LS laser was turned on 1 to 1.5 hours before running samples.

The concentration, c, at each point in the chromatogram was calculated from the baseline-subtracted DRI signal, $I_{DRI}$, using the following equation:

$c = K_{DRI} I_{DRI}/(dn/dc)$ where $K_{DRI}$ is a constant determined by calibrating the DRI, and (dn/dc) is the same as described below for the light scattering (LS) analysis. Units on parameters throughout this description of the SEC method can be such that concentration is expressed in g/cm$^3$, molecular weight is expressed in g/mole, and intrinsic viscosity is expressed in dL/g.

The light scattering detector was a Wyatt Technology High Temperature mini-DAWN. The polymer molecular weight, M, at each point in the chromatogram was determined by analyzing the LS output using the Zimm model for static light scattering (M. B. Huglin, LIGHT SCATTERING FROM POLYMER SOLUTIONS, Academic Press, 1971):

$$\frac{K_o c}{\Delta R(\theta)} = \frac{1}{MP(\theta)} + 2A_2 c$$

Here, $\Delta R(\theta)$ is the measured excess Rayleigh scattering intensity at scattering angle $\theta$, c is the polymer concentration determined from the DRI analysis, $A_2$ is the second virial coefficient or 0.0006 for propylene polymers and 0.001 otherwise, $P(\theta)$ is the form factor for a monodisperse random coil (M. B. Huglin, LIGHT SCATTERING FROM POLYMER SOLUTIONS, Academic Press, 1971), and $K_o$ is the optical constant for the system:

$$K_o = \frac{4\pi^2 n^2 (dn/dc)^2}{\lambda^4 N_A}$$

in which $N_A$ is Avogadro's number, and (dn/dc) is the refractive index increment for the system. The refractive index, n=1.500 for TCB at 145° C. and λ=690 nm. For purposes of this invention and the claims thereto (dn/dc)=0.104 for propylene polymers and 0.1 otherwise.

A high temperature Viscotek Corporation viscometer, which has four capillaries arranged in a Wheatstone bridge configuration with two pressure transducers, was used to determine total specific viscosity. One transducer measures the total pressure drop across the detector, and the other, positioned between the two sides of the bridge, measures a differential pressure. The specific viscosity, $\eta_s$, for the solution flowing through the viscometer is calculated from their outputs. The intrinsic viscosity, [η], at each point in the chromatogram is calculated from the following equation:

$$\eta_s = c[\eta] + 0.3(c[\eta])^2$$

where c is concentration and was determined from the DRI output.

Differential Scanning Calorimetry (DSC) was used to determine the melting temperature (Tm), melting point, melting peak(s), melting transition, or the absence thereof. To measure the presence or absence of a melting temperature (Tm), melting point, melting peak(s), and/or melting transition, a Perkin Elmer Pyris 1 was used to record DSC traces. Typically, 6-10 mg of a polymer was sealed in a pan with a hermetic lid and loaded into the instrument. In a nitrogen environment, the sample was first cooled to −100° C. at 20° C./min. It was heated to 220° C. at 10° C./min and melting data (first heat) were acquired. This provides information on the melting behavior. The sample was then heated from room temperature to 220° C. at a rate of 10° C./min (first heat) and then equilibrated at 220° C. to erase its thermal history. Crystallization data (first cool) was acquired by cooling the sample from the melt to −100° C. at 10° C./min and equilibrated at −100° C. Finally it was heated again to 220° C. at 10° C./min to acquire additional melting data (second heat). The endothermic melting transitions, if any, were determined from first and second heat traces. The exothermic crystallization transition, if any, was determined from the first cool trace.

A "melting point," if present, is the highest peak among principal and secondary melting peaks as determined by DSC during the second melt, discussed above. A "peak" in this context is defined as a change in the general slope of the DSC curve (heat flow versus temperature) from positive to negative forming a maximum without a shift in the baseline where the DSC curve is plotted so that an endothermic reaction would be shown with a positive peak. A "melting peak" is defined as a peak that occurs as a result of a melting transition and above the material's glass transition temperature (Tg). The thermal output, if any, is recorded as the area under the melting peak of the sample. The thermal output, if any, is measured in Joules as a measure of the heat of fusion.

Not wishing to be bound by theory, the combination of process parameters described above will provide free flowing pellets before packaging of amorphous ethylene-propylene copolymers having an MFR in the range of from 2 g/10 mm to about 9 g/10 min (230° C., 2.16 kg). It is further believed that a pellet L/D of about 0.8 to about 1.2 provides stable free flowing pellets that do not agglomerate. It is further believed that if the pellets are too flat or disk-like (pellet L/D<0.8) the pellets will cohere together and agglomerate on the conveying equipment en route to the duster, in the duster, or in the conveying equipment from the duster to the baling equipment. Likewise, it is further believed that if the pellets are oblong (L/D>1.5), the pellets will cohere together and agglomerate on the conveying equipment. It is further believed that if the pellets are substantially smaller, e.g. more than 10%, than about 3 mm in diameter, their shape is difficult to control, they are more difficult to convey, and they tend to agglomerate. Accordingly, it is believed that if the pellets are substantially larger, e.g. more than 10%, than about 3 mm in diameter, the heat is difficult to remove which may lead to warmer and therefore softer pellets that will agglomerate due to their increased stickiness and increased tendency to cold flow.

Certain embodiments and features have been described using a set of numerical upper limits and a set of numerical lower limits. It should be appreciated that ranges from any lower limit to any upper limit are contemplated unless otherwise indicated. Certain lower limits, upper limits and ranges appear in one or more claims below. All numerical values are "about" or "approximately" the indicated value, and take into account experimental error and variations that would be expected by a person having ordinary skill in the art.

Various terms have been defined above. To the extent a term used in a claim is not defined above, it should be given the broadest definition persons in the pertinent art have given that term as reflected in at least one printed publication or issued patent. Furthermore, all patents, test procedures, and other documents cited in this application are fully incorporated by reference to the extent such disclosure is not inconsistent with this application and for all jurisdictions in which such incorporation is permitted.

While the foregoing is directed to embodiments of the present invention, other and further embodiments of the invention may be devised without departing from the basic scope thereof, and the scope thereof is determined by the claims that follow.

What is claimed is:

1. An extruded, copolymer pellet, comprising:
  a copolymer comprising an ethylene content of about 40 wt % to about 50 wt % and a propylene content of about 50 wt % to about 60 wt %, based on total weight of the copolymer, wherein the copolymer has:
    a MFR (230° C./2.16 kg) of from about 3.0 g/10 min to about 25 g/10 min;
    a MWD (Mw/Mn) of about 2.3 or less; and
    no measurable melting peak, as measured by DSC.

2. The pellet of claim 1, wherein the pellet has a length to diameter ratio (L/D) of from about 0.8 to about 1.2.

3. The pellet of claim 1, wherein the pellet has a diameter of about 3.0 mm or more.

4. The pellet of claim 1, wherein the pellet has a diameter of about 3.0 mm or more and a length to diameter ratio (L/D) of from about 0.8 to about 1.2.

5. The pellet of claim 1, further comprising dust in an amount of about 1.0 wt % or less, based on total weight of the copolymer.

6. The pellet of claim 1, further comprising ethylene vinyl acetate (EVA) in an amount of about 1.0 wt % or less, based on total weight of the copolymer.

7. The pellet of claim 1, wherein the MFR is about 5.0 g/10 min to about 15.0 g/10 min.

8. The pellet of claim 1, wherein the MFR is about 5.0 g/10 min to about 10 g/10 min.

9. The pellet of claim 1, wherein the MFR is about 5.8 g/10 min to about 7.8 g/10 min.

10. The pellet of claim 1, wherein the ethylene content is about 43 wt % to about 50 wt %.

11. The pellet of claim 1, wherein the ethylene content is about 43 wt % to about 46 wt %.

12. The pellet of claim 1, wherein the ethylene content is about 46 wt % to about 50 wt %.

13. A method for making a copolymer pellet, comprising:
pelletizing a copolymer comprising an ethylene content of about 40 wt % to about 50 wt % and a propylene content of about 50 wt % to about 60 wt %, based on total weight of the copolymer, wherein the copolymer has a MFR (230° C./2.16 kg) of from about 3.0 g/10 min to about 25 g/10 min; a MWD (Mw/Mn) of about 2.3 or less; and no measurable melting peak, as measured by DSC, to provide at least one pellet having a diameter of about 3.0 mm or more and a length to diameter ratio (L/D) of from about 0.8 to about 1.2; and
dusting the pellet with about 1.0 wt % or less dust, based on total weight of the pellet, wherein the dusted pellet has:
a MFR (230° C./2.16 kg) of from about 3.0 g/10 min to about 10 g/10 min;
a MWD (Mw/Mn) of about 2.3 or less; and
no measurable melting peak, as measured by DSC.

14. The method of claim 13, further comprising bagging the pellet.

15. The method of claim 13, further comprising dust in an amount of about 0.8 wt % or less, based on total weight of the copolymer.

16. The method of claim 13, further comprising ethylene vinyl acetate (EVA) in an amount of about 1.0 wt % or less, based on total weight of the copolymer.

17. The method of claim 13, wherein the MFR is about 5.0 g/10 min to about 10 g/10 min.

18. The method of claim 13, wherein the MFR is about 5.8 g/10 min to about 7.8 g/10 min.

19. The method of claim 13, wherein the ethylene content is about 46 wt % to about 48 wt %.

20. The method of claim 13, wherein the ethylene content is about 43 wt % to about 46 wt %.

21. The method of claim 13, wherein the ethylene content is about 46 wt % to about 50 wt %.

22. A method for making a copolymer pellet, comprising:
polymerizing ethylene and propylene in the presence of a catalyst composition at conditions sufficient to produce an ethylene-propylene copolymer comprising an ethylene content of about 40 wt % to about 50 wt % and a propylene content of about 50 wt % to about 60 wt %, based on total weight of the copolymer, wherein the catalyst composition comprises di(p-triethylsilylphenyl)methenyl[(cyclopentadienyl)(2,7-di-tert-butylfluoren-9-yl)] hafnium dimethyl and N,N-dimethylanilinium tetrakis(pentafluorophenyl)borate;
pelletizing the copolymer to provide at least one pellet having a diameter of about 3.0 mm or more and a length to diameter ratio (L/D) of from about 0.8 to about 1.2; and
dusting the pellet with about 0.8 wt % or less dust, based on total weight of the pellet, wherein the dusted pellet has:
a MFR (230° C./2.16 kg) of from about 3.0 g/10 min to about 10 g/10 min;
a MWD (Mw/Mn) of about 2.3 or less; and
no measurable melting peak, as measured by DSC.

23. The method of claim 22, wherein the ethylene content is about 46 wt % to about 50 wt %.

24. The method of claim 22, wherein the ethylene content is about 46 wt % to about 48 wt %.

25. The method of claim 22, wherein the MFR is about 5.8 g/10 min to about 7.8 g/10 min.

* * * * *